(12) United States Patent
Ikeda et al.

(10) Patent No.: US 6,744,547 B2
(45) Date of Patent: Jun. 1, 2004

(54) LASER WAVELENGTH CONVERTER

(75) Inventors: Naoaki Ikeda, Kobe (JP); Takashi Akaba, Kobe (JP); Osamu Noda, Takasago (JP); Susumu Miki, Takasago (JP); Yuichi Ohtani, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 36 days.

(21) Appl. No.: 09/926,785

(22) PCT Filed: Apr. 16, 2001

(86) PCT No.: PCT/JP01/03219

§ 371 (c)(1),
(2), (4) Date: Dec. 19, 2001

(87) PCT Pub. No.: WO01/79929

PCT Pub. Date: Oct. 25, 2001

(65) Prior Publication Data

US 2002/0136247 A1 Sep. 26, 2002

(30) Foreign Application Priority Data

Apr. 19, 2000 (JP) ......................................... 2000-117635

(51) Int. Cl.$^7$ ............................... G02F 1/01; G02F 1/23
(52) U.S. Cl. ..................... 359/238; 359/278; 359/288
(58) Field of Search ................................ 359/238, 237, 359/245, 278, 288, 289

(56) References Cited

U.S. PATENT DOCUMENTS 4,820,011 A * 4/1989 Umegaki et al. ............. 385/37
5,754,714 A * 5/1998 Suzuki et al. ................. 385/5
6,374,906 B1 * 4/2002 Peterson et al. ........... 165/80.3
6,377,455 B1 * 4/2002 Nelik ........................ 361/687

FOREIGN PATENT DOCUMENTS

| JP | 5-72577 | 3/1993 |
| JP | 5-100267 | 4/1993 |
| JP | 5-218530 | 8/1993 |
| JP | 6-289446 | 10/1994 |
| JP | 7-306428 | 11/1995 |
| JP | 8-95104 | 4/1996 |
| JP | 11-64903 | 3/1999 |
| JP | 11-119272 | 4/1999 |

* cited by examiner

Primary Examiner—Georgia Epps
Assistant Examiner—Jack Dinh
(74) Attorney, Agent, or Firm—Oblon, Spivak, McClelland, Maier & Neustadt, P.C.

(57) ABSTRACT

A nonlinear optical crystal device, a wavelength conversion element, is surrounded with a heat sink having cooling fins. Cartridge heaters for uniformly heating the nonlinear optical crystal device are arranged in the heat sink, and the temperature of the cartridge heater is regulated by a heater controller. Laser light is input into the nonlinear optical crystal device, and delivered therefrom after its wavelength is converted into a shortened wavelength. When the repetition frequency of laser light is high, heating by the heaters is stopped, and cooling is effected with the heat sink. When the repetition frequency of laser light is low, heating by the heaters is carried out to maintain the temperature of the nonlinear optical crystal device to be a temperature at which a conversion efficiency is satisfactory.

18 Claims, 9 Drawing Sheets

PRIOR ART

LASER WAVELENGTH CONVERTER

TECHNICAL FIELD

This invention relates to a laser wavelength conversion apparatus designed to be able to perform wavelength conversion with high efficiency even when the repetition frequency of laser light is varied dynamically.

BACKGROUND OF THE INVENTION

It has been common practice to perform wavelength conversion of the wavelength of laser light emitted from a laser oscillator, thereby obtaining laser light with a short wavelength. In performing exposure for production of a high density LSI, for example, ultraviolet laser light is required. Thus, it has been done to convert infrared laser with a long wavelength, which has been generated by a solid state laser oscillator, into laser light with a short wavelength by a laser wavelength conversion apparatus, thereby obtaining ultraviolet laser light.

A laser wavelength conversion apparatus has a nonlinear optical crystal device, a wavelength conversion element. When laser light is incident on the entrance end surface of the nonlinear optical crystal device, laser light with a wavelength shortened as a result of wavelength conversion is delivered from the exit end surface of the nonlinear optical crystal device. KTP ($KTiOPO_4$), LBO ($LiB_3O$), BBO ($\beta$-$BaB_2O_6$), and CLBO ($CsLiB_6O_{10}$) are known as such a nonlinear optical crystal device.

The above-mentioned nonlinear optical crystal device is cut so as to fulfill the conditions for phase matching at a preset temperature. Making the set temperature several tens of degrees higher than room temperature brings the benefit that influence by fluctuations in room temperature can be minimized. Depending on the type of the device, darkening of the crystal device many minimally occur at high temperatures. For example, it has been recommended to set the temperature at 80° C. for KTP ($KTiOPO_4$), LBO ($LiB_3O$), and BBO ($\beta$-$BaB_2O_6$), and at 150° C. for CLBO ($CsLiB_6O_{10}$).

A conventional laser wavelength conversion apparatus 1 will be described with reference to FIG. 9, a front view. A nonlinear optical crystal device (a wavelength conversion element) 2 is fixed to a holder 3, and a heater 4 is disposed below the nonlinear optical crystal device 2 and in the interior of a lower portion of the holder 3. A thermocouple 5 is installed between the heater 4 and the nonlinear optical crystal device 2. The outer periphery of the holder 3 and the heater 4 is surrounded with a heat insulator 6.

Figure 9:
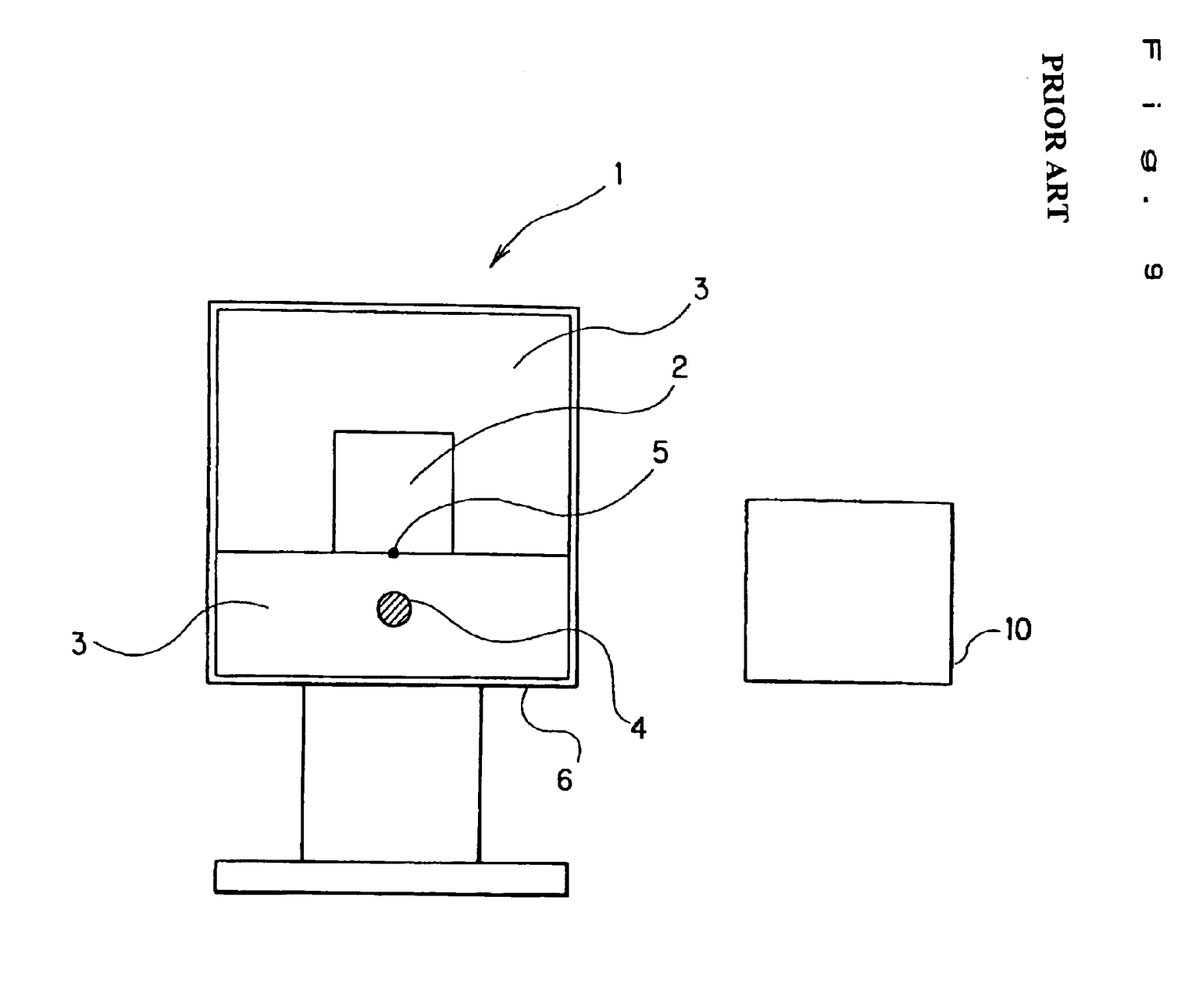
FIG. 9 is a front view showing a conventional laser wavelength conversion apparatus.

In FIG. 9, laser light advances along a direction perpendicular to the sheet surface, enters the entrance end surface of the nonlinear optical crystal device 2 (i.e., the face side of the sheet surface of FIG. 9), and passes through the interior of the nonlinear optical crystal device 2. During this passage, the laser light undergoes wavelength conversion, and exits from the exit end surface (the surface located at the farthest position on the back side of the sheet surface).

A heater controller 10 regulates heat generation of the heater 4 by turning on and off an electric current fed to the heater 4, and a detection signal on a temperature detected by the thermocouple 5 is transmitted to the heater controller 10.

With the above-described conventional laser wavelength conversion apparatus 1, the heater 4 generates heat based on control by the heater controller 10 to heat the nonlinear optical crystal device 2 and the holder 3 and raise their temperatures. When their heating and temperature raising are complete, they are thermally insulated and kept warm by the heat insulator 6. Thus, heat dissipation to the outside is suppressed, and the temperature of the nonlinear optical crystal device 2 becomes stable. A solid state relay is incorporated in the heater controller 10, and this solid state relay is on-off controlled so that the value of the temperature detection signal (i.e., temperature) from the thermocouple 5 reaches the set temperature.

Conventionally, only cases in which laser light of a constant repetition frequency is continuously incident have been defined. Thus, the amount of heat input in accordance with the absorption of some of laser light to the nonlinear optical crystal device 2 during laser light entry was constant. Therefore, the temperature of the nonlinear optical crystal device 2 was stabilized merely by on-off control of the solid state relay. That is, the temperature of the nonlinear optical crystal device 2 could be maintained at such a temperature as to maximize the conversion efficiency, or at a temperature in the vicinity of this temperature.

Recently, however, the necessity has arisen for performing an operation for dynamically varying the repetition frequency of incident laser light at the user's request. When the repetition frequency of laser light is varied dynamically, the amount of heat input associated with the absorption of laser light to the nonlinear optical crystal device 2 increases or decreases in accordance with the variation of the repetition frequency.

In increasing the repetition frequency of laser light, in particular, the amount of heat input to the nonlinear optical crystal device 2 increases, thus arousing the need to cool the nonlinear optical crystal device 2. Simply stopping the heating of the heater 4, however, still posed difficulty in promptly cooling the nonlinear optical crystal device 2 to a temperature range in which the conversion efficiency is satisfactory, because the heat insulator 6 is present around the nonlinear optical crystal device 2. In other words, the outcome was poor temperature stability.

The present invention has been accomplished in view of the foregoing conventional technologies. The object of the invention is to provide a laser wavelength conversion apparatus which can maintain the temperature of a nonlinear optical crystal device stably in a temperature range in which the conversion efficiency is satisfactory, even when the repetition frequency of laser light is varied dynamically.

DISCLOSURE OF THE INVENTION

The present invention is configured to have a wavelength conversion element for performing wavelength conversion of laser light entered from an entrance end surface and delivering laser light of a shortened wavelength from an exit end surface; a heat sink surrounding the peripheral surface of the wavelength conversion element and having cooling fins; a heater for uniform heating disposed in the heat sink in such a state as to surround the periphery of the wavelength conversion element; a temperature sensor for measuring the temperature of the wavelength conversion element; and a heater controller for controlling an electric current supplied to the heater for uniform heating so that the temperature detected by the temperature sensor becomes a preset temperature.

Because of this configuration, when the repetition frequency of laser light is high, heating by the heater for uniform heating is stopped, whereby satisfactory cooling is performed by the heat sink having the cooling fins. As a result, the temperature of the wavelength conversion element can be brought to the set temperature at which the conversion efficiency is satisfactory. When the repetition frequency of laser light is low, on the other hand, heating by the heater for uniform heating is carried out, whereby the temperature of the wavelength conversion element can be brought to the set temperature at which the conversion efficiency is satisfactory. Consequently, always satisfactory wavelength conversion can be achieved, even when the frequency of incident laser light is varied dynamically.

The present invention is also configured such that of the cooling fins of the heat sink, the cooling fins located on side surfaces are arranged in such a state as to extend in a vertical direction.

Thus, air heated by the cooling fins ascend naturally as an ascending air stream, thus increasing the cooling efficiency.

Moreover, the upper and lower fins and the fins on the side surfaces are perpendicular. Thus, there is no inflow of a heat release air stream between these fins, so that cooling by the respective fins takes place effectively.

The present invention is also configured such that the heater for uniform heating is a plurality of rod-shaped heaters arranged in the heat sink at equal intervals in such a state as to surround the periphery of the wavelength conversion element and in such a state as to extend in the direction of an optical axis.

The present invention is also configured such that the heater for uniform heating is a film-shaped heater disposed in such a state as to surround the outer peripheral surface of the heat sink.

Thus, the wavelength conversion element can be heated uniformly, so that satisfactory wavelength conversion can be ensured.

In the present invention, heaters for temperature gradient correction are placed on the entrance side end surface and the exit side end surface of the heat sink, and the heater controller exercises temperature control such that the amount of heat generation from the heater for temperature gradient correction on the entrance end surface side is larger than the amount of heat generation from the heater for temperature gradient correction on the exit end surface side.

Thus, the temperature gradient in the direction of the optical axis can be eliminated, and the efficiency of wavelength conversion can be further improved.

The present invention is also configured such that a loop gas pipe for blowing a cooling gas uniformly from surroundings toward the exit end surface of the wavelength conversion element is disposed on the exit end surface side of the heat sink.

Thus, the temperature gradient in the direction of the optical axis can be eliminated, and the efficiency of wavelength conversion can be further improved.

The present invention is also configured such that the wavelength conversion element is divided along the direction of the optical axis, and an anti-reflection coating or optical polishing is applied to the end surfaces of the resulting divisional wavelength conversion elements.

Thus, the loss can be decreased.

BEST MODE FOR CARRYING OUT THE INVENTION

Embodiments of the present invention will be described in detail based on the accompanying drawings.

<First Embodiment>

Figure 1:
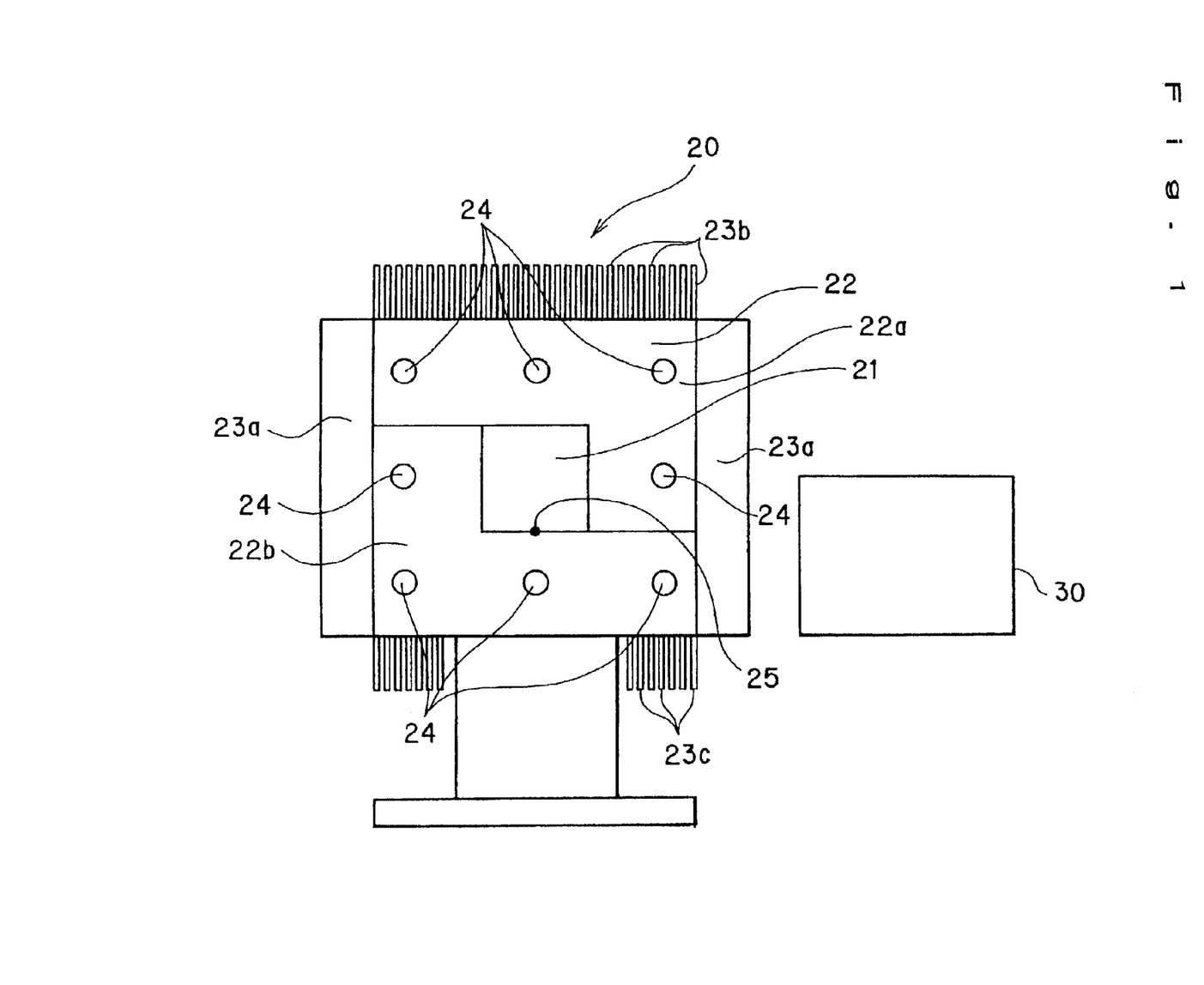
FIG. 1 is a front view showing a laser wavelength conversion apparatus according to a first embodiment of the present invention.
Figure 2:
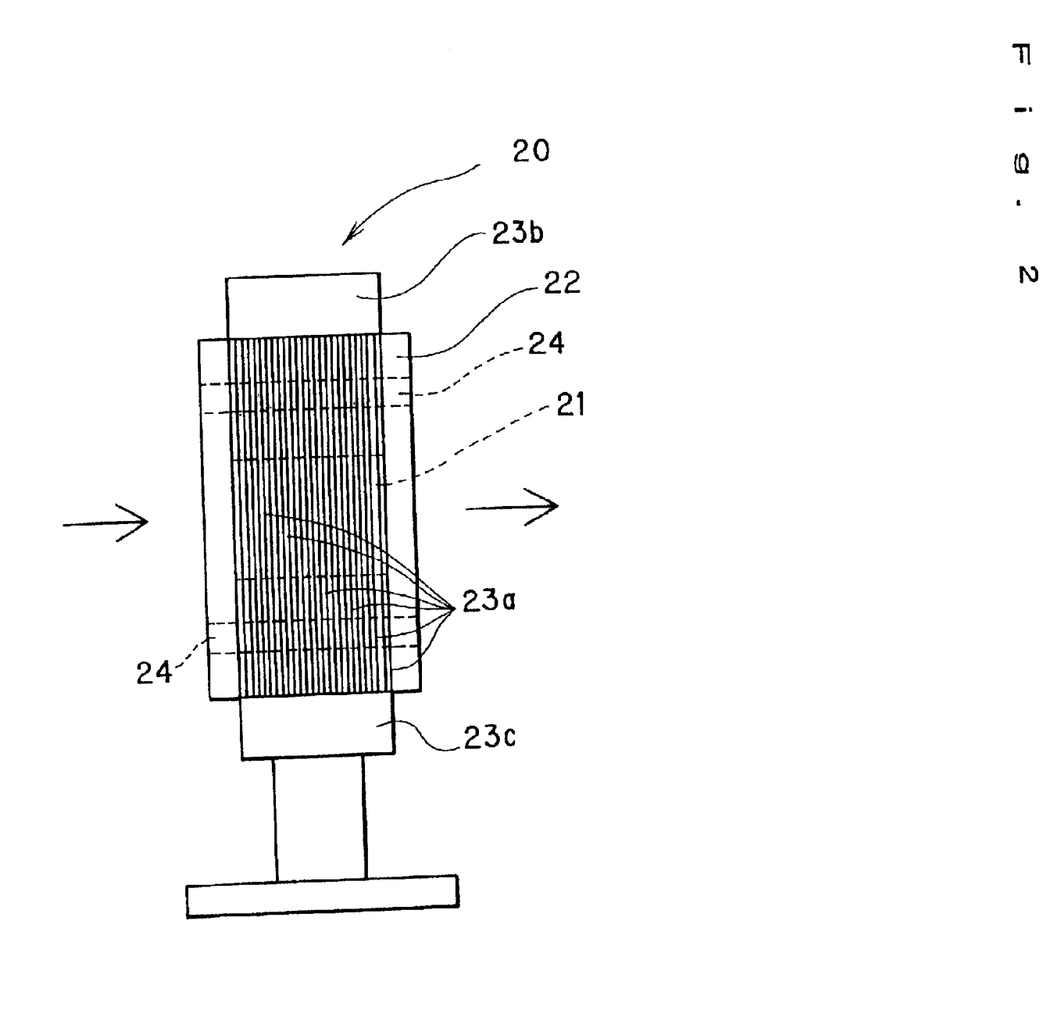
FIG. 2 is a side view showing the laser wavelength conversion apparatus according to the first embodiment of the present invention.

A laser wavelength conversion apparatus 20 according to a first embodiment of the present invention will be described with reference to FIG. 1, a front view (a view on the entrance end surface side), and FIG. 2, a side view.

As shown in both drawings, a nonlinear optical crystal device 21 is inserted into and disposed in a central hole of a heat sink 22. The heat sink 22 is constituted by combining heat sink members 22a and 22b of an L-shaped cross section. The nonlinear optical crystal device 21 is coated, on its peripheral surface, with a silicon compound, and then inserted into the central hole of the heat sink 22. In other words, the peripheral surface of the nonlinear optical crystal device 21 is surrounded with the heat sink 22. The silicon compound is coated for the purposes of the effect of accommodating the thermal expansion of the nonlinear optical crystal device 21, and the effect of preventing the nonlinear optical crystal device 21 from slipping off.

Cooling fins 23a extending vertically are formed on right and left side surfaces of the heat sink 22, cooling fins 23b are formed on the top surface of the heat sink 22, and cooling fins 23c are formed on the bottom surface of the heat sink 22.

A plurality of (8 in the present embodiment) cartridge heaters (heaters for uniform heating) 24 are arranged at equal intervals in the heat sink 22 in such a state as to surround the periphery of the nonlinear optical crystal device 21. The cartridge heaters 24 are rod-shaped heaters, and they are arranged in such a state as to extend in the direction of the optical axis. These heaters are coated, on the peripheral surface thereof, with a silicon compound, and then inserted into holes formed in the heat sink 22.

A thermocouple 25 is installed between the lower surface of the nonlinear optical crystal device 21 and the heat sink 22, and a detection signal on a temperature detected by the thermocouple 25 is transmitted to a heater controller 30. The heater controller 30 incorporates a thyristor control circuit for controlling the value of an electric current supplied to the cartridge heaters 24. The heater controller 30 controls the electric current supplied to the cartridge heater 24 so that the value of the detection signal on the temperature (i.e., the value as the temperature) detected by the thermocouple 25 will be a set value (set temperature) which imparts the best conversion efficiency to the nonlinear optical crystal device 21. As the temperature detection element, a resistance bulb or a thermistor, with a high accuracy of temperature detection, can be used in addition to the thermocouple.

With the laser wavelength conversion apparatus 20 in the above configuration, when laser light of a high repetition frequency enters the nonlinear optical crystal device 21 to raise the temperature of the nonlinear optical crystal device 21, the heater controller 30 cuts off the supply of the electric current to the cartridge heaters 24, stopping the heat generation of the cartridge heaters 24. At this time, satisfactory cooling is performed by the cooling fins 23a, 23b, 23c. Particularly, the cooling fins 23a on the right and left side surfaces extend vertically, and air heated by these cooling fins 23a goes upward naturally as an ascending air stream, so that effective cooling can be carried out by the cooling fins 23a. Furthermore, the cooling fins 23a and the cooling fins 23b, 23c are perpendicular to each other. Thus, the heat release air stream from the cooling fins 23c does not flow into the cooling fins 23a, while the heat release air stream from the cooling fins 23a does not flow into the cooling fins 23b, so that effective cooling can take place.

Consequently, even if laser light with a high repetition frequency enters the nonlinear optical crystal device 21 to increase the amount of heat generation, the temperature of the nonlinear optical crystal device 21 can be maintained at the set temperature, at which the conversion efficiency is the highest, by the cooling function of the cooling fins 23a, 23b, 23c. Conversely, even if laser light of the maximum repetition frequency expected enters the nonlinear optical crystal device 21 to maximize the amount of heat generation, the amount of heat release by the cooling fins 23a, 23b, 23c has been set so that the set temperature imparting the best conversion efficiency is not exceeded.

If laser light admitted into the nonlinear optical crystal device 21 has a low repetition frequency, or if the energy of laser light entered is low, the temperature of the nonlinear optical crystal device 21 lowers, and the value of the temperature detection signal (i.e., the value of temperature) from the thermocouple 25 also decreases.

At this time, the heater controller 30 increases the amount of the electric current supplied to the cartridge heaters 24. Moreover, the heater controller 30 thyristor-controls the amount of the electric current supplied to the cartridge heaters 24 so as to be able to maintain the set value (set temperature) at which the conversion efficiency is best for the nonlinear optical crystal device 21.

Hence, even if the repetition frequency of laser light incident on the nonlinear optical crystal device 21 is varied dynamically, the temperature of the nonlinear optical crystal device 21 can be maintained at the set temperature, at which the conversion efficiency is maximal, by heat elimination by the cooling fins 23a, 23b, 23c, or by heating with the cartridge heaters 24.

<Second Embodiment>

Figure 3:
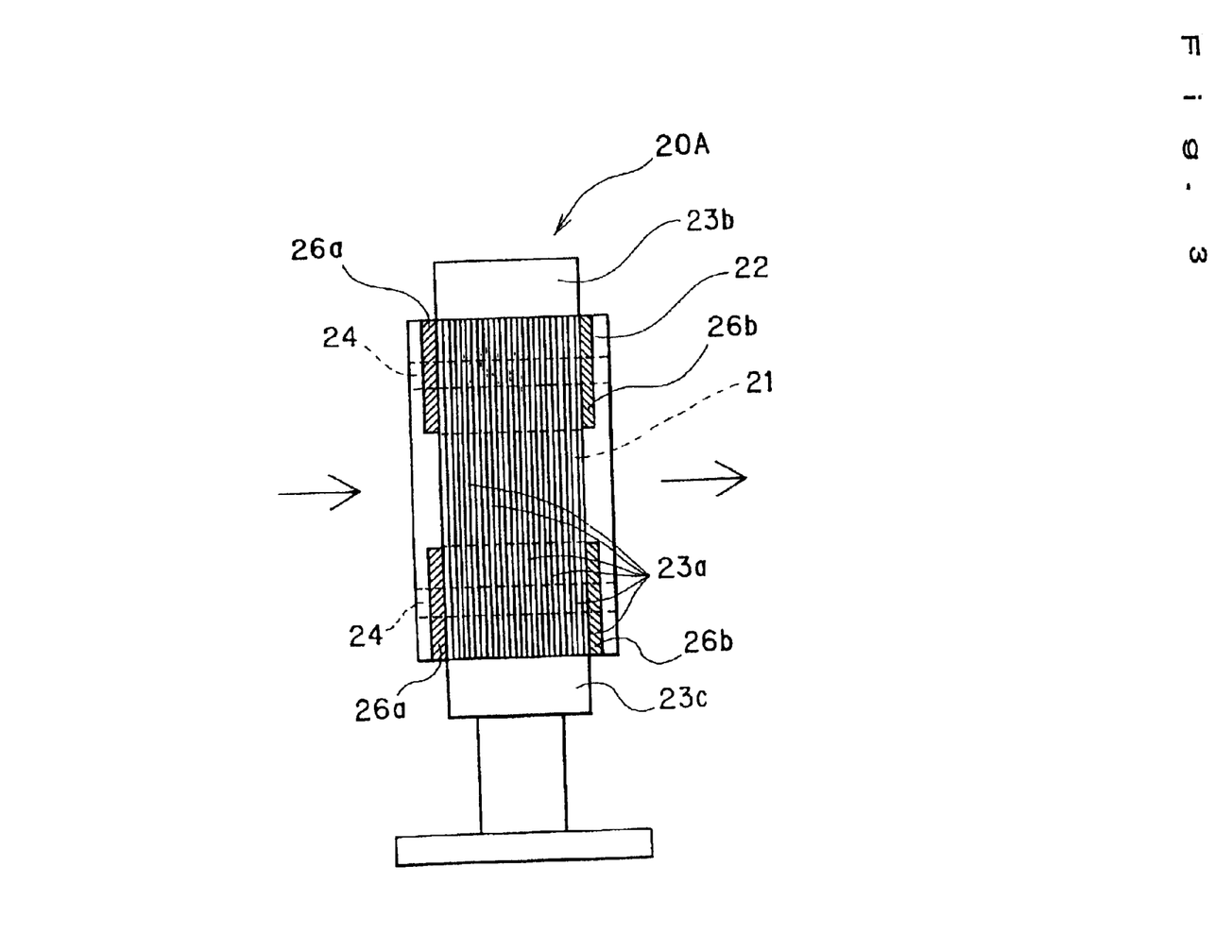
FIG. 3 is a sectional side view showing a laser wavelength conversion apparatus according to a second embodiment of the present invention.

A laser wavelength conversion apparatus 20A according to a second embodiment of the present invention will be described with reference to FIG. 3, a sectional side view.

In the second embodiment, plate heaters 26a are arranged on the entrance end surface (left end surface in FIG. 3) of the heat sink 22 on which laser light is incident, while plate heaters 26b are arranged on the exit end surface (right end surface in FIG. 3) of the heat sink 22 from which laser light is delivered. A configuration for other portions is the same as in the First Embodiment illustrated in FIGS. 1 and 2. The plate heaters 26a, 26b are heaters for axial temperature gradient correction, and their temperature control is exercised by the heater controller 30 (see FIG. 1).

According to the Second Embodiment, temperature control is performed such that when laser light is entered into the nonlinear optical crystal device 21, the amount of heat generation from the plate heaters 26a is greater than the amount of heat generation from the plate heaters 26b. Of course, the temperature control of the cartridge heaters 24 is also performed. As a result, the set temperature of the nonlinear optical crystal device 21 is adjusted to such a temperature that the conversion efficiency is maximal.

When laser light, especially, ultraviolet light of a short wavelength (generally 400 nm or less), is delivered as converted light, the absorptivity of the nonlinear optical crystal device 21 increases, as compared with the converted light being visible light. The ultraviolet converted light resulting from wavelength conversion begins to occur at the entrance end surface of the nonlinear optical crystal device 21, increases in the amount of conversion while advancing in the crystal, and reaches a maximum conversion at the exit end surface. That is, there is an increase in ultraviolet converted light along the direction of the optical axis of the nonlinear optical crystal device 21, and there is also an increase in the amount of absorption in the crystal. Thus, in the absence of the plate heaters 26a, 26b, the temperature is low on the entrance end surface side and high on the exit end surface side, producing a temperature gradient (temperature nonuniformity) along the direction of the optical axis. In the presence of such a temperature nonuniformity, the refractive index of the crystal changes, and the phase matching conditions are disturbed, thus lowering the conversion efficiency.

According to the present embodiment, the amount of heat generation of the plate heaters 26a on the entrance end surface side is rendered larger than the amount of heat generation of the plate heaters 26b on the exit end surface side, whereby the above-described temperature gradient (temperature nonuniformity) along the direction of the optical axis is eliminated. As a result, it becomes possible to suppress the decline in the conversion efficiency of the nonlinear optical crystal device 21.

Instead of the plate heaters 26a, 26b, it is possible to embed the rod-shaped heaters in the entrance end surface and the exit end surface of the heat sink 22, or use a ribbon heater.

It is essential, here, that heaters for eliminating the temperature gradient (temperature nonuniformity) along the direction of the optical axis be provided on the entrance end surface and the exit end surface of the heat sink 22 in addition to the cartridge heaters 24 for uniformly heating the nonlinear optical crystal device 21.

<Third Embodiment>

Figure 4:
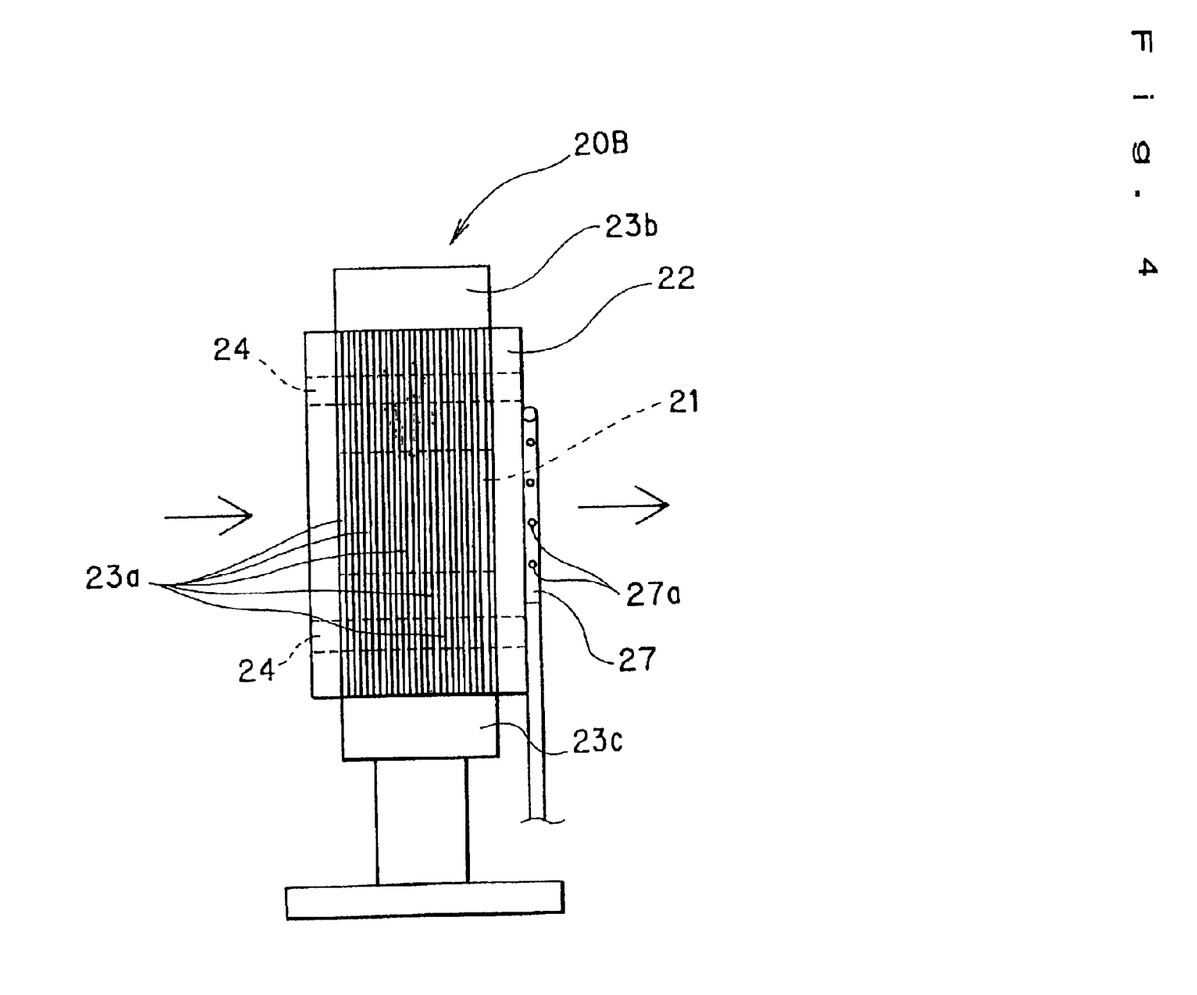
FIG. 4 is a sectional side view showing a laser wavelength conversion apparatus according to a third embodiment of the present invention.
Figure 5:
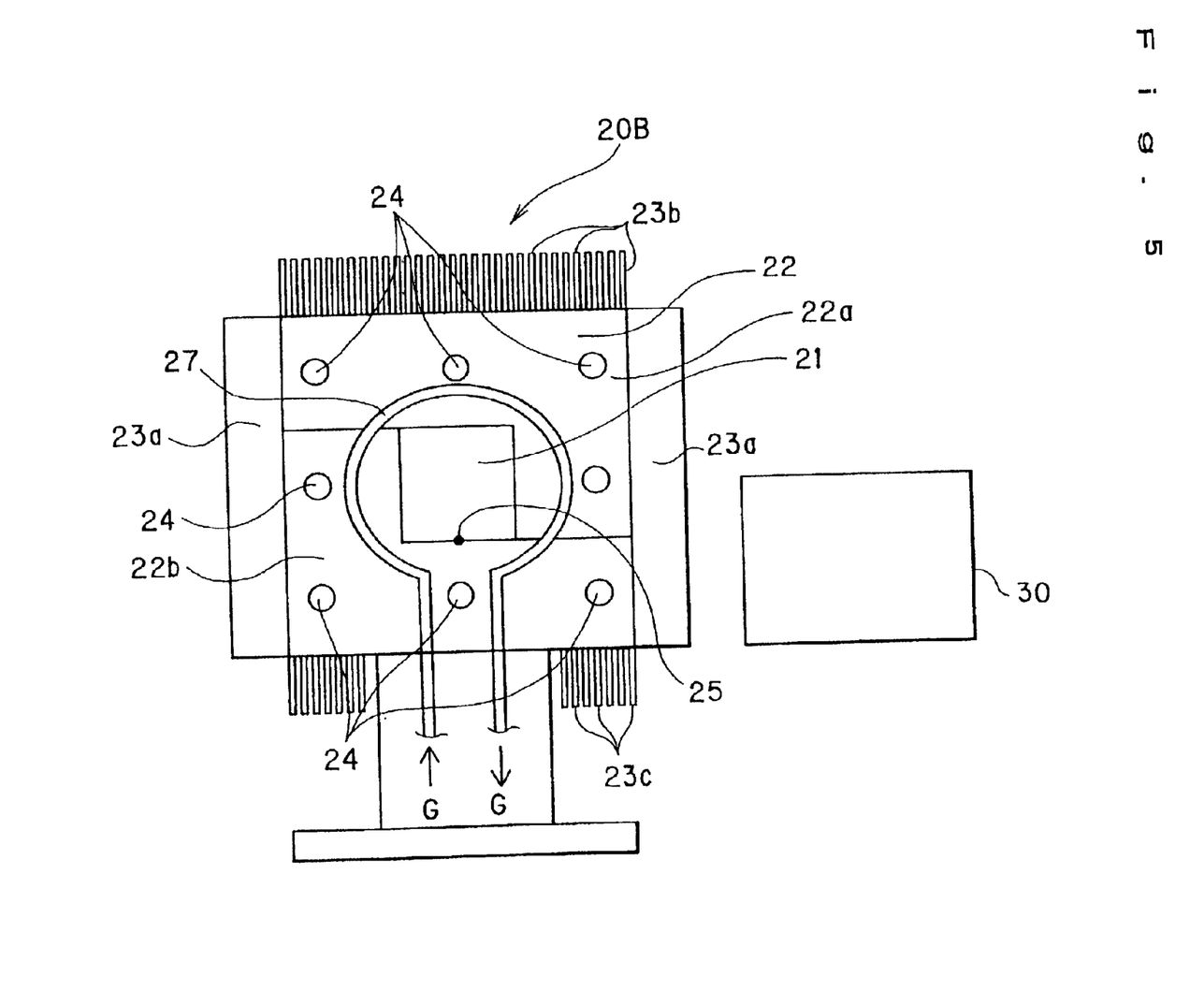
FIG. 5 is a rear view showing the laser wavelength conversion apparatus according to the third embodiment of the present invention.

A laser wavelength conversion apparatus 20B according to a third embodiment of the present invention will be described with reference to FIG. 4, a sectional side view, and FIG. 5, a view as viewed from the exit end surface side.

According to the third embodiment, a loop gas pipe 27 of a loop shape is disposed on the exit end surface side of a nonlinear optical crystal device 21. The loop gas pipe 27 is disposed in a state surrounding the exit end surface of the nonlinear optical crystal device 21, and a plurality of jet ports 27a are arranged at equal intervals on the inner periphery of the loop gas pipe 27. The loop gas pipe 27 is supplied with an inert gas G, such as helium or nitrogen. The inert gas is jetted evenly from the jet ports 27a toward the surroundings of the exit end surface of the nonlinear optical crystal device 21 to cool the exit end surface side of the nonlinear optical crystal device 21 evenly. Thus, it becomes possible to eliminate the temperature gradient (temperature nonuniformity) along the direction of the optical axis of the nonlinear optical crystal device 21, thereby suppressing the decrease in the conversion efficiency.

<Fourth Embodiment>

Figure 6:
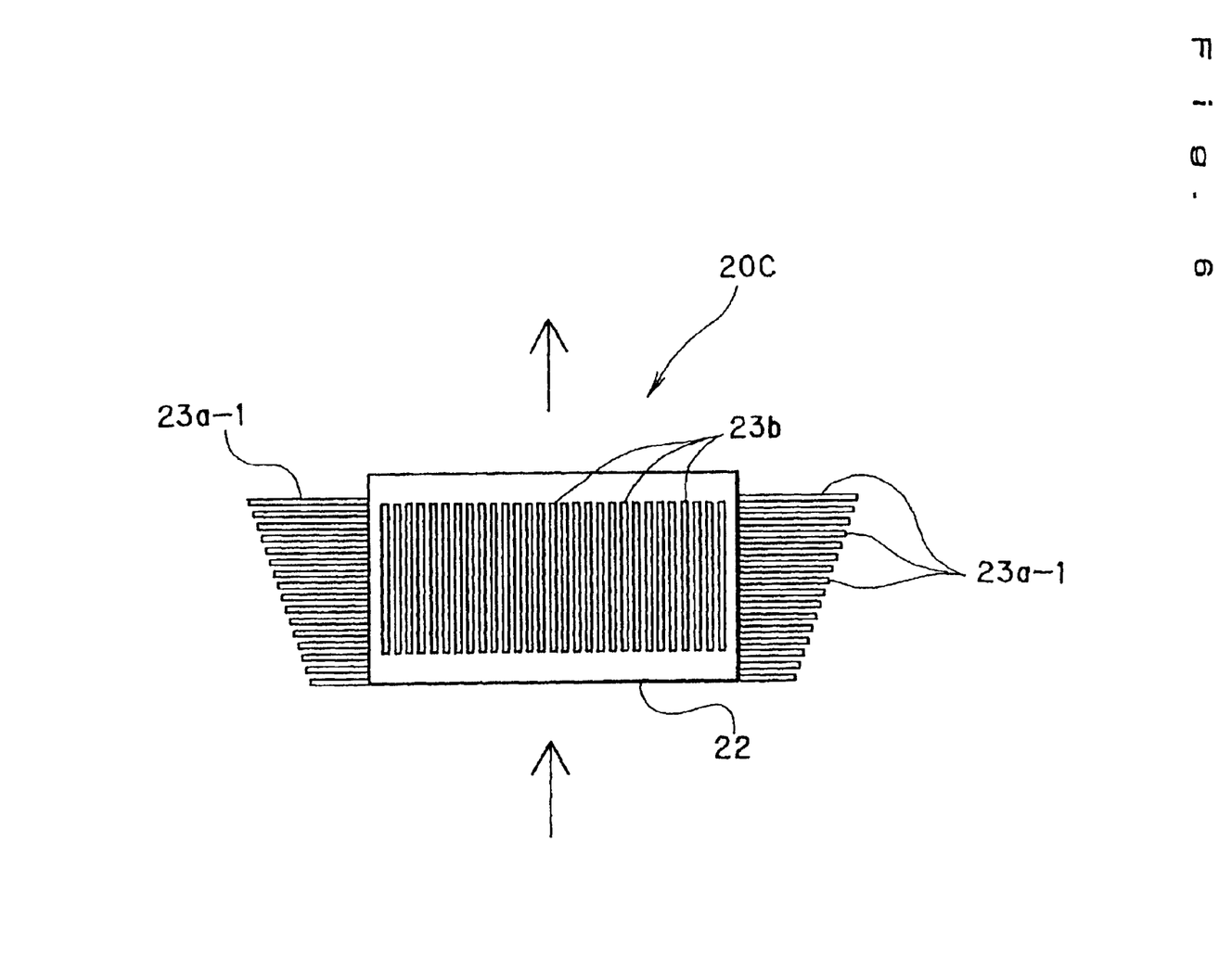
FIG. 6 is a plan view showing a laser wavelength conversion apparatus according to a fourth embodiment of the present invention.

A laser wavelength conversion apparatus 20C according to a fourth embodiment of the present invention will be described with reference to FIG. 6, a plan view. In the present embodiment, cooling fins 23a-1 provided on the right and left side surfaces of a heat sink 22 become longer from the entrance end surface side toward the exit end surface side. That is, the heat release ability on the exit end surface side is increased. Thus, the temperature gradient (temperature nonuniformity) along the direction of the optical axis of the nonlinear optical crystal device 21 can be eliminated to improve the conversion efficiency.

<Fifth Embodiment>

Figure 7:
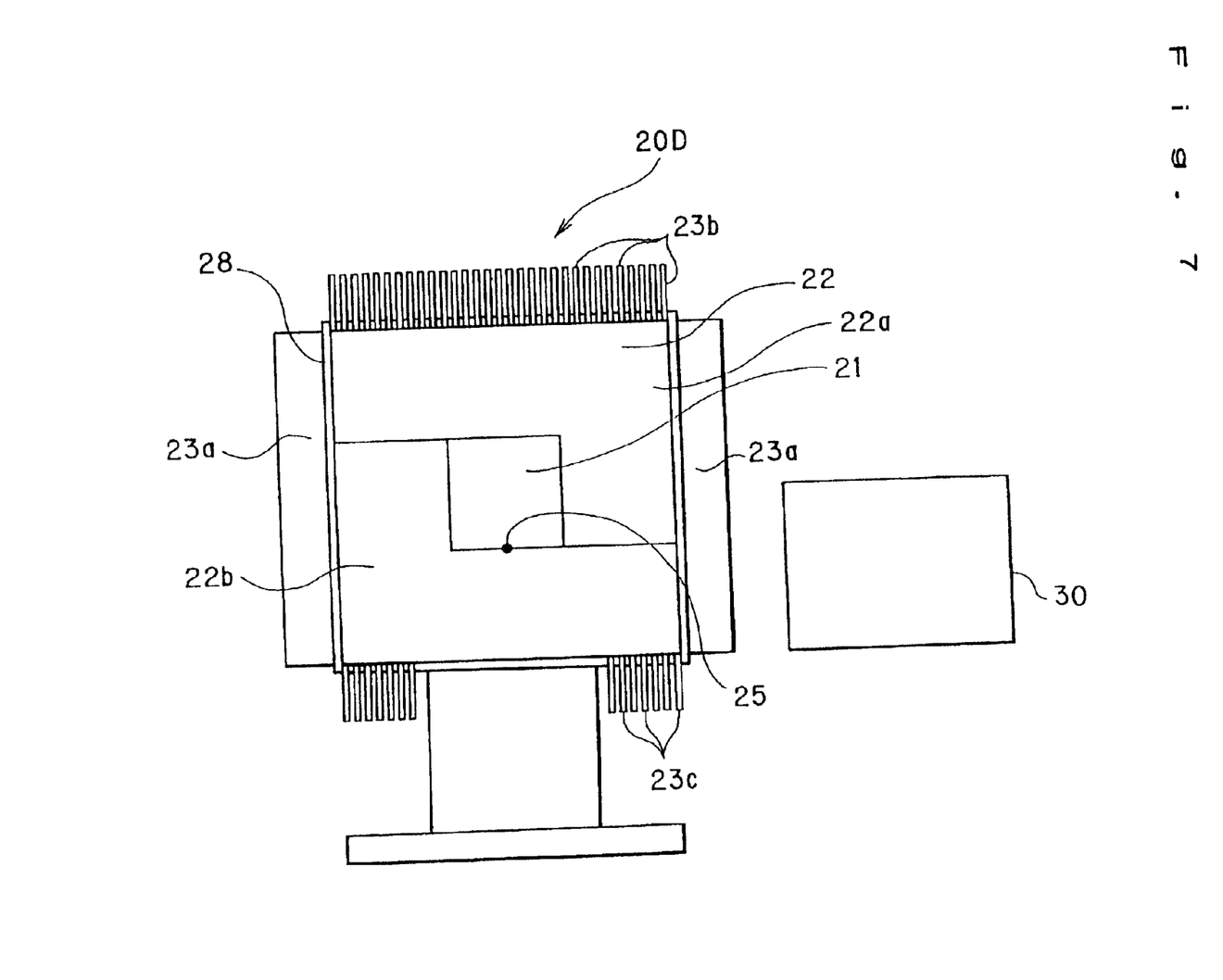
FIG. 7 is a front view showing a laser wavelength conversion apparatus according to a fifth embodiment of the present invention.

A laser wavelength conversion apparatus 20D according to a fifth embodiment of the present invention will be described with reference to FIG. 7, a front view. In this embodiment, a film-shaped heater 28 is employed as a heater for uniform heating, and no cartridge heater 24 is used. The film-shaped heater 28 is disposed in a state surrounding the outer peripheral surface of a heat sink 22, and its temperature is regulated by a heater controller 30. The configuration of other portions is the same as in the First Embodiment. The film-shaped heater 28 can uniformly raise the temperature of the heat sink 22, accordingly, nonlinear optical crystal device 21.

<Sixth Embodiment>

Figure 8:
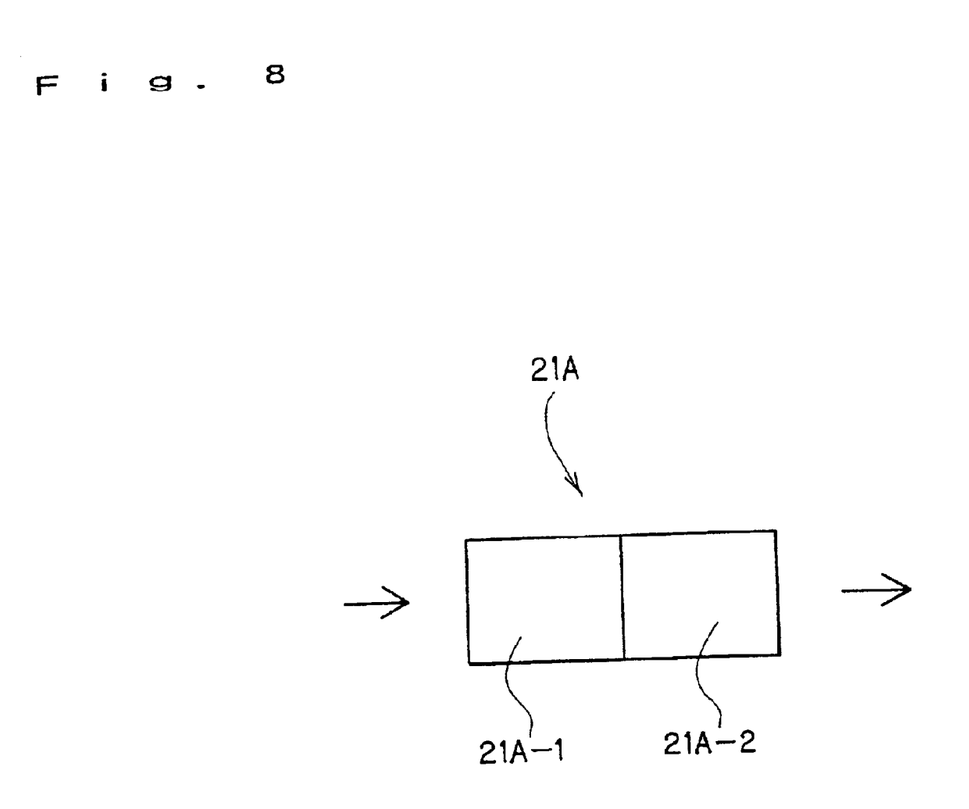
FIG. 8 is a front view showing a nonlinear optical crystal device used in a sixth embodiment of the present invention.

Next, a nonlinear optical crystal device 21A for use in a laser wavelength conversion apparatus according to a sixth embodiment of the present invention will be described with reference to FIG. 8. As shown in FIG. 8, the nonlinear optical crystal device 21A is divided into two parts midway along the axial direction, and is constituted by connecting the resulting two nonlinear optical crystal devices 21A-1 and 21A-2. By so adopting a divided configuration, it becomes possible to decrease the temperature gradient (temperature nonuniformity) in the direction of the optical axis and curtail the decrease in the conversion efficiency.

In this case, an anti-reflection coating for the incident laser light wavelength and the converted wavelength is applied to the entrance end surface and exit end surface of each of the nonlinear optical crystal devices 21A-1 and 21A-2, whereby losses can be decreased.

Moreover, the bonding end surfaces of the nonlinear optical crystal devices 21A-1 and 21A-2 are optically polished and bonded together, whereby reflection losses of incident laser light and converted light can be decreased.

The nonlinear optical crystal device 21A can be divided into two or more parts.

INDUSTRIAL APPLICABILITY

According to the laser wavelength conversion apparatus of the present invention, as described above, when the repetition frequency of laser light is high, heating by the heater for uniform heating is stopped, whereby satisfactory cooling is performed by the heat sink having the cooling fins. As a result, the temperature of the wavelength conversion element can be brought to the set temperature at which the conversion efficiency is satisfactory. When the repetition frequency of laser light is low, on the other hand, heating by the heater for uniform heating is carried out, whereby the temperature of the wavelength conversion element can be brought to the set temperature at which the conversion efficiency is satisfactory. Consequently, always satisfactory wavelength conversion can be achieved, even when the frequency of incident laser light is varied dynamically.

What is claimed is:

1. A laser wavelength conversion apparatus comprising:
   a wavelength conversion element for performing wavelength conversion of laser light entered from an entrance end surface and delivering laser light of a shortened wavelength from an exit end surface;
   a heat sink surrounding a peripheral surface of said wavelength conversion element and having cooling fins;
   a heater for uniform heating disposed in said heat sink and surrounding said peripheral surface of said wavelength conversion element;
   a temperature sensor for measuring a temperature of said wavelength conversion element; and
   a heater controller for controlling an electric current supplied to said heater for uniform heating so that the temperature measured by said temperature sensor becomes a preset temperature,
   wherein the cooling fins formed on upward sides of the heat sink have planar faces extending vertically, and
   wherein the planar faces of the cooling fins formed on the upward sides of the heat sink are arranged perpendicular to planar faces of the cooling fins formed on lower and upper sides of the heat sink.

2. The laser wavelength conversion apparatus as claimed in claim 1, wherein the cooling fins increase in surface area from the entrance end surface of the heat sink to the exit end surface of the heat sink.

3. The laser wavelength conversion apparatus as claimed in claim 1,
   wherein said heater for uniform heating is a plurality of rod-shaped heaters arranged in said heat sink at equal intervals so as to surround said peripheral surface of said wavelength conversion element and to extend in a direction of said optical axis.

4. The laser wavelength conversion apparatus as claimed in claim 1,
   wherein said heater for uniform heating is a film-shaped heater disposed so as to surround an outer peripheral surface of said heat sink.

5. The laser wavelength conversion apparatus as claimed in claim 1, further comprising:
   heaters for temperature gradient correction placed on an entrance side end surface and an exit side end surface of said heat sink,
   wherein said heater controller exercises temperature control such that an amount of heat generation from said heaters for temperature gradient correction on said entrance side end surface is larger than an amount of heat generation from said heaters for temperature gradient correction on said exit side end surface.

6. The laser wavelength conversion apparatus as claimed in claim 1, further comprising:
   a loop gas pipe for blowing a cooling gas uniformly from surroundings toward the exit side end surface of said wavelength conversion element,
   wherein said loop gas pipe is disposed on an exit end surface side of said heat sink.

7. The laser wavelength conversion apparatus as claimed in claim 1, further comprising:
   an anti-reflection coating applied to end surfaces of the divided wavelength conversion element.

8. The laser wavelength conversion apparatus as claimed in claim 1, wherein end surfaces of the divided wavelength conversion element comprise a polished surface.

9. The laser wavelength conversion apparatus as claimed in claim 1, wherein said wavelength conversion element is divided along a direction of an optical axis.

10. A laser wavelength conversion apparatus comprising:

means for performing wavelength conversion of laser light entered from an entrance end surface and delivering laser light of a shortened wavelength from an exit end surface;

means for retaining heat surrounding a peripheral surface of said means for performing wavelength conversion and having cooling fins;

means for uniformly heating disposed in said means for retaining heat and surrounding said peripheral surface of said means for performing wavelength conversion;

means for measuring a temperature of said means for performing wavelength conversion; and means for controlling an electric current supplied to said means for uniformly heating so that the temperature measured by said means for measuring the temperature becomes a preset temperature, wherein the cooling fins formed on upward sides of the heat sink have planar faces extending vertically, and wherein the planar faces of the cooling fins formed on the upward sides of the heat sink are arranged perpendicular to planar faces of the cooling fins formed on lower and upper sides of the heat sink.

11. The laser wavelength conversion apparatus as claimed in claim 10, wherein the cooling fins increase in surface area from the entrance end surface of the heat sink to the exit end surface of the heat sink.

12. The laser wavelength conversion apparatus as claimed in claim 10, wherein said means for uniformly heating is a plurality of rod-shaped heaters arranged in said means for retaining heat at equal intervals so as to surround said peripheral surface of said means for performing wavelength conversion and to extend in a direction of said optical axis.

13. The laser wavelength conversion apparatus as claimed in claim 10, wherein said means for uniformly heating is a film-shaped heater disposed so as to surround an outer peripheral surface of said means for retaining heat.

14. The laser wavelength conversion apparatus as claimed in claim 10, further comprising:

means for temperature gradient correction placed on an entrance side end surface and an exit side end surface of said means for retaining heat, wherein said means for controlling an electric current supplied to said means for uniformly heating exercises temperature control such that an amount of heat generation from said means for temperature gradient correction on said entrance side end surface is larger than an amount of heat generation from said means for temperature gradient correction on said exit side end surface.

15. The laser wavelength conversion apparatus as claimed in claim 10, further comprising:

means for blowing a cooling gas uniformly from surroundings toward the exit side end surface of said means for performing wavelength conversion, wherein said means for blowing a cooling gas is disposed on an exit side end surface of said heat means for retaining heat.

16. The laser wavelength conversion apparatus as claimed in claim 10, further comprising:

means for inhibiting reflection applied to end surfaces of the divided means for performing wavelength conversion.

17. The laser wavelength conversion apparatus as claimed in claim 10, wherein end surfaces of the divided wavelength conversion mean comprise a polished surface.

18. The laser wavelength conversion apparatus as claimed in claim 10, wherein said means for performing wavelength conversion is divided along a direction of an optical axis.

* * * * *